3,847,912
NOVEL - 5 - NITROFURFURALDEHYDE DERIVATIVES AND PROCESS FOR THEIR PREPARATION AND PHARMACEUTICAL COMPOSITIONS CONTAINING SAME
Shankar Somasekhara and Dinesh Maganlal Desai, Wadi Wadi, Baroda, India, assignors to Karamchand Premchand Private Limited, Ahmedabad, Gujarat State, India
No Drawing. Filed Jan. 12, 1973, Ser. No. 323,025
Int. Cl. C09b 23/00
U.S. Cl. 260—240 A
9 Claims

ABSTRACT OF THE DISCLOSURE

Novel 5-nitro-furfuraldehyde derivatives of the formula I

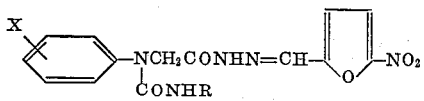

where X is hydrogen, methyl or methoxy, R is amino or 5-nitrofurfuryl-imino are provided according to this invention. These compounds are prepared by reacting 5-nitro-furfuraldehyde with the corresponding hydrazide. These compounds are useful as potent bacterial, antifungal and antituberculosis agents.

---

This invention relates to novel 5-nitrofurfuraldehyde derivatives, process for their preparation and pharmaceutical compositions containing same.

It is an object of this invention to propose novel 5-nitrofurfuraldehyde derivatives and process for their preparation.

It is another object of this invention to propose new pharmaceutical compositions having the novel compounds of this invention.

It is in particular an object of this invention to propose novel 5-nitrofurfuraldehyde derivatives having antibacterial, antifungal and antituberculous properties and a process for preparing same.

It is thus in particular another object of this invention to propose new pharmaceutical compositions having the novel compounds of this invention to be useful as potent antibacterial, antifungal and anti-tuberculous compositions and also for controlling infectional diseases of the urinary tract.

According to this invention the novel 5-nitrofurfuraldehyde derivatives are of the general formula I

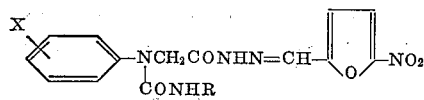

where X is hydrogen, methyl or methoxy and R is amino or 5-nitrofurfarylimino.

This invention also provides a process for the preparation of novel 5-nitrofurfuraldehyde derivatives of the general formula I defined above which comprises reacting a hydrazide of the general formula II

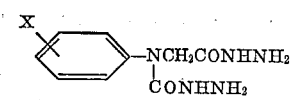

with one or two molar equivalents of 5-nitrofurfuraldehyde of the formula III

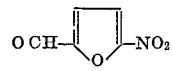

The reaction can be carried out in the presence of a solvent at temperatures below 100° C. and above 20° C.

As solvents mentioned may be made of ethanol, dilute hydrochloric acid, acetic acid, dimethylformamide or mixtures thereof. The reaction can be carried out from 5 minutes to about 45 minutes.

The obtained products may be purified, if desired, by recrystallisation in conventional manner.

In the process of this invention when one molar equivalent of 5-nitrofurfuraldehyde is used the obtained compound will have the substitution, amino in the meaning of R in the formula I. But when two molar equivalents of 5-nitrofurfuraldehyde are used the meaning of R in formula I will be 5-nitrofurfurylimino.

As novel compounds of this invention mention may be made of the following which are named for illustration purposes only and is not to be construed as any limitation thereof.

5-Nitrofurfurylidene (N-hydrazinocarbonyl-α-anilinoacetic acid hydrazide)
Bis-5-Nitrofurfurylidene (N-hydrazinocarbonyl-α-anilinoacetic acid hydrazide)
Bis-5-Nitrofurfurylidene (N-hydrazinocarbonyl-α-p-toluidinoacetic acid hydrazide)
Bis-5-Nitrofurfurylidene (N-hydrazinocarbonyl-α-p-anisidinoacetic acid hydrazide)
Bis-5-Nitrofurfurylidene (N-hydrazinocarbonyl-m-anisidinoacetic acid hydrazide)
Bis-5-Nitrofurfurylidene (N-hydrazinocarbonyl-α-m-toluidinoacetic acid hydrazide)
Bis-5-Nitrofurfurylidene (N-hydrazinocarbonyl-α-o-toluidinoacetic acid hydrazide)
Bis-5-Nitrofurfurylidene (N-hydrazinocarbonyl-α-o-anisidinoacetic acid hydrazide).

Known nitrofuran derivatives are essentially antibacterial and they are not equally efficient as antifungals. It has been surprisingly discovered by us that the active compounds of this invention not only exhibit antibacterial and antifungal properties but also anti-tuberculous activities. Because of the high level of excretion in the urine, the novel compounds of the invention are also useful in the treatment of urinary tract infections.

For a better understanding of the properties of compounds of the present invention, detailed biological studies of these compounds were carried out and compared with the properties of "Nitrofurantoin" under similar conditions. The results of some of these comparative studies are presented in the Table 1 attached.

The results presented in the Table I will give a fair idea of the potent antibacterial and antifungal properties of the active compounds of the invention.

The novel compounds of this invention can be formulated into useful pharmaceutical compositions by admixing with pharmaceutically acceptable solid or liquid carriers therefor.

Thus, various formulations, viz. liquids, dusts, tablets, granules, emulsifiable concentrates and wettable powders can be prepared by conventional procedures.

For example, liquids may be prepared by dissolving the active ingredients in a suitable pharmaceutically acceptable liquid carrier therefor with or without conventional adjuvants like emulsifiers, wetting agents or dispersing agents. Suitable as liquid carriers are organic solvents like propylene glycol, dimethylformamide, polyethylene glycol etc.

It is also possible to employ known antimicrobials like sulphamethiazole, nitrofurantoin and known antifungals like derivatives of salicylaldehyde in conjunction with the active compounds of this invention.

The concentration of active ingredient in the composition of this invention may normally be a minimum 0.1% by weight and preferably from about 0.5% to about 60% by weight, based upon the total weight of the composition, although the amount of active ingredient employed will depend upon such factors as the type and severity of diseases, the form of a composition or the specific active ingredient. It should, however, be understood, that the amount of an active ingredient employed is not the critical feature of this invention. Two or more of said active ingredients may be conveniently incorporated into the composition of this invention.

The preparation of the novel compounds of this invention will now be more fully described with reference to the following examples which are by way of illustration only and is not to be construed as limitation thereof.

EXAMPLE 1

5-Nitrofurfurylidene (N-hydrazinocarbonyl-α-anilino-acetic acid hydrazide)

N-Hydrazinocarbonylanilinoacetic acid hydrazide (1 g.) was dissolved in alcohol and acetic acid (10 ml. each). To the solution was then added 5-nitrofurfuraldehyde (0.63 g.); the reaction mixture was held at 60° C. for 10 minutes when the title product separated out melting at 205° C. (d).

EXAMPLE 2

Bis-5-Nitrofurfurylidene (N-hydrazinocarbonyl-α-anilinoacetic acid hydrazide) SRC 1751

N-Hydrazinocarbonylanilinoacetic acid hydrazide (1.1 g.) was taken in alcohol and acetic acid (10 ml. each). To it was then added 5-nitrofurfuraldehyde (1.4 g.) and the reaction mixture was heated at 70° C. for 5 minutes when the title product melting at 223° C. (d) separated out.

EXAMPLE 3

Bis-5-Nitrofurfurylidene (N-hydrazinocarbonyl-α-p-toluidinoacetic acid hydrazide) SRC 179

To N-Hydrazinocarbonyl-α-p-toluidinoacetic acid hydrazide (1.16 g.) in dilute hydrochloric acid (20 ml. 2N) was added 5-nitrofurfuraldehyde (1.4 g.) in ethanol (10 ml.). The reaction mixture was held at 40° C. for 15 minutes and filtered. The precipitate was suspended in 5% sodium acetate solution to obtain the title product melting at 220° C. (d).

EXAMPLE 4

Bis-5-Nitrofurfurylidene (N-hydrazinocarbonyl-α-p-anisidinoacetic acid hydrazide) SRC 1837

To a suspension of N-hydrazinocarbonyl-α-p-anisidinoacetic acid hydrazide (2.5 g.) in alcohol and acetic acid (20 and 10 ml.) was added 5-nitrofurfuraldehyde (2.8 g.). The reaction mixture was stirred at 50° C. for 30 minutes. The reaction mixture was cooled to 10° C. and then filtered to obtain the title product melting at 212° C.

EXAMPLE 5

Bis-5-Nitrofurfurylidene (N-hydrazinocarbonyl-α-m-anisidinoacetic acid hydrazide) SRC 1840

The reaction was carried out starting from N-hydrazinecarbonyl-α-m-anisidinoacetic acid hydrazide and following the procedure for Example 4. The title product obtained melted at 215° C. (d).

EXAMPLE 6

Bis-5-Nitrofurfurylidene (N-hydrazinocarbonyl-α-m-toluidinoacetic acid hydrazide) SRC 1848

The reaction was carried out starting from N-hydrazino; carbonyl-α-m-toluidinoacetic acid hydrazide and following

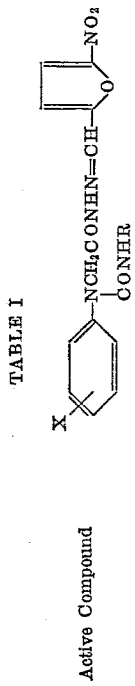

TABLE I the procedure for Example 4. The title product obtained melted at 208° C. (d).

EXAMPLE 7

Bis-5-Nitrofurfurylidene (N-hydrazinocarbonyl-α-o-toluidinoacetic acid hydrazide) SRC 1863

To N-hydrazinocarbonyl-α-o-toluidine acetic acid hydrazide (2.3 g.) in dimethyl formamide (8 ml.) was added 5-nitrofurfuraldehyde (2.8 g.) in ethanol (10 ml.) and heated at 90° C. for 5 minutes. It was then cooled and diluted with water to obtain the title product melting at 215° C. (d).

EXAMPLE 8

Bis-5-Nitrofurfurylidene (N-hydrazinecarbonyl-α-o-anisidinacetic acid hydrazide) SRC 1864

To N-hydrazinocarbonyl-α-o-anisidinoacetic acid hydrazide (2.5 g.) in dimethylformamide (6 ml.) was added 5-nitrofurfuraldehyde (2.8 g.) in acetic acid (3 ml.) and heated at 70° C. for 5 minutes. It was then cooled and diluted with water to obtain the title product melting at 220° C. (d).

Having now described the nature of the invention and ascertained the manner in which the same is to be performed what we claim is:

1. Novel 5-Nitrofurfuraldehyde derivatives of the general formula I

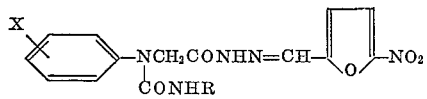

wherein X is hydrogen, methyl or methoxy and R is amino or 5-nitrofurfuralimino group.

2. The compound according to claim 1, which is 5-nitrofurfurylidene (N-hydrazinocarbonyl-α-anilinoacetic acid hydrazide).

3. The compound according to claim 1, which is bis-5-nitrofurfurylidene (N-hydrazinocarbonyl-α-anilinoacetic acid hydrazide).

4. The compound according to claim 1, which is bis-5-nitrofurfurylidene (N-hydrazinocarbonyl-α-p-toluidinoacetic acid hydrazide).

5. The compound according to claim 1, which is bis-5-nitrofurfurylidene (N-hydrazinocarbonyl - α - p-anisidinoacetic acid hydrazide).

6. The compound according to claim 1, which is bis-5-nitrofurfurylidene (N-hydrazinocarbonyl - α - m-anisidinoacetic acid hydrazide).

7. The compound according to claim 1, which is bis-5-nitrofurfurylidene (N - hydrazinocarbonyl-α-m-toluidinoacetic acid hydrazide).

8. The compound according to claim 1, which is bis-5-nitrofurfurylidene (N-hydrazinocarbonyl - α - o-toluidinoacetic acid hydrazide).

9. The compound according to claim 1, which is bis-5-nitrofurfurylidene (N - hydrazinocarbonyl-α-o-anisidinoacetic acid hydrazide).

References Cited

UNITED STATES PATENTS

| 3,096,347 | 7/1963 | Wright | 260—347.5 |
| 3,127,420 | 3/1964 | Ebetino | 260—347.3 |

FOREIGN PATENTS

| 1,121,311 | 7/1968 | England | 260—240 A |

OTHER REFERENCES

Chemical Abstracts, vol. 43, col. 7480° (1949).
Chemical Abstracts, Sixth Collective Index (vols. 51–55), p. 2383s (abstracting years 1957 to 1961), received POSL 1964.
Chemical Abstracts, vol. 52, cols. 10879–10880 (1958) (abst. of Takeda et al.).
Chemical Abstracts, vol. 68, abst. no. 104642f (1968) (abst. of Yurzhenko et al.).

JOHN D. RANDOLPH, Primary Examiner

U.S. Cl. X.R.

424—285; 260—471 C